United States Patent
McMakin et al.

(10) Patent No.: US 6,703,964 B2
(45) Date of Patent: *Mar. 9, 2004

(54) INTERROGATION OF AN OBJECT FOR DIMENSIONAL AND TOPOGRAPHICAL INFORMATION

(75) Inventors: Douglas L. McMakin, Richland, WA (US); Ronald H. Severtsen, Richland, WA (US); Thomas E. Hall, Richland, WA (US); David M. Sheen, Richland, WA (US); Mike O. Kennedy, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/301,552

(22) Filed: Nov. 21, 2002

(65) Prior Publication Data

US 2003/0128150 A1 Jul. 10, 2003

Related U.S. Application Data

(63) Continuation of application No. 09/810,054, filed on Mar. 16, 2001, now Pat. No. 6,507,309.

(51) Int. Cl.$^7$ .............................................. G01S 13/00
(52) U.S. Cl. ........................................ 342/22; 342/179
(58) Field of Search ........................ 342/22, 179; 367/8

(56) References Cited

U.S. PATENT DOCUMENTS

| 3,713,156 A | 1/1973 | Pothier |
| 3,990,436 A | 11/1976 | Ott |
| 4,635,367 A | 1/1987 | Vigede |
| 4,705,401 A | 11/1987 | Addleman et al. |
| 4,737,032 A | 4/1988 | Addleman et al. |

(List continued on next page.)

FOREIGN PATENT DOCUMENTS

| EP | 0 636 898 A1 | 2/1995 |
| WO | WO 02/17231 A2 | 2/2002 |

OTHER PUBLICATIONS

David Sheen, Douglas McMakin, and Thomas E. Hall, "Combined illumination cylindrical millimeter–wave imaging technique for concealed weapon detection", SPIE Proceedings Publication (Apr. 26, 2000).

Clive Cookson, "Body scanners to shape our shopping", London (Dated at least as early as Dec. 1, 2000).

SAE International, print–out of website at URL www.sae.org/technicalcommittees (Feb. 2000).

Andrea Ahles, "The Caesar Project", print–out of website at URL thunder.temple.edu/~mridenou/pe204/BodyAnthro-Caesar.html, Philadelphia Inquirer (Feb. 11, 1999).

Cyberware, "The World's First Whole Body Scanners Bring True Human Forms to Computer Graphics", print–out of website at URL www.cyberware.com/pressReleases/firstW-B.html, Monterey, CA (May 11, 1995).

(List continued on next page.)

Primary Examiner—Thomas H. Tarcza
Assistant Examiner—Brian Andrea
(74) Attorney, Agent, or Firm—Woodard, Emhardt, Moriarty McNett & Henry LLP

(57) ABSTRACT

Disclosed are systems, methods, devices, and apparatus to interrogate a clothed individual with electromagnetic radiation to determine one or more body measurements at least partially covered by the individual's clothing. The invention further includes techniques to interrogate an object with electromagnetic radiation in the millimeter and/or microwave range to provide a volumetric representation of the object. This representation can be used to display images and/or determine dimensional information concerning the object.

42 Claims, 9 Drawing Sheets

U.S. PATENT DOCUMENTS

| | | |
|---|---|---|
| 4,916,634 A | 4/1990 | Collins et al. |
| 5,060,393 A | 10/1991 | Silverman et al. |
| 5,073,782 A | 12/1991 | Huguenin et al. |
| 5,081,456 A | 1/1992 | Michiguchi et al. |
| 5,170,170 A | 12/1992 | Soumekh |
| 5,227,797 A | 7/1993 | Murphy |
| 5,227,800 A | 7/1993 | Huguenin et al. |
| 5,414,803 A | 5/1995 | Malzbender |
| 5,455,587 A | 10/1995 | Schneider |
| 5,455,590 A | 10/1995 | Collins et al. |
| 5,557,283 A | 9/1996 | Sheen et al. |
| 5,680,528 A | 10/1997 | Korszun |
| 5,740,800 A | 4/1998 | Hendrickson et al. |
| 5,747,822 A | 5/1998 | Sinclair et al. |
| 5,796,363 A | 8/1998 | Mast |
| 5,833,599 A | 11/1998 | Schrier et al. |
| 5,835,054 A | 11/1998 | Warhus et al. |
| 5,859,609 A | 1/1999 | Sheen et al. |
| 5,864,640 A | 1/1999 | Miramonti et al. |
| 5,870,220 A | 2/1999 | Migdal et al. |
| 5,956,525 A | 9/1999 | Minsky |
| 5,995,014 A | 11/1999 | DiMaria |
| 6,075,455 A | 6/2000 | DiMaria et al. |
| 6,144,388 A | 11/2000 | Bornstein |
| 6,441,734 B1 | 8/2002 | Gutta et al. |
| 6,507,309 B2 * | 1/2003 | McMakin et al. ............ 342/22 |

OTHER PUBLICATIONS

Cyberware, "*Cyberware Whole Body Scanning*", print–out of website at URL www.cyberware.com/products/WholeBody.html. (1999).

Cyberware, "*Cyberware Extracts Tailor Measurements from 3D Scan Data*", print–out of website at URL www.cyberware.com/pressReleases/arn.html, Monterey, CA (Aug. 1, 1997).

Cyberware, "*Body Measurement/Garment Fitting Software*", print–out of website at URL www.cyberware.com/pressReleases/digisize_PR1.html, Monterey, CA (Aug. 9, 1999).

Cyberware, "*Laser Sizes Up Your Body, Fits Your Clothing*", print–out of website at URL www.cyberware.com/pressRelease/digisize_PR2.html, Monterey, CA (Aug. 9, 1999).

* cited by examiner

INTERROGATION OF AN OBJECT FOR DIMENSIONAL AND TOPOGRAPHICAL INFORMATION

CROSS-REFERENCE TO RELATED APPLICATIONS

The present application is a continuation of U.S. patent application Ser. No. 09/810,054 filed Mar. 16, 2001 U.S. Pat. No. 6,507,309, which is hereby incorporated by reference in its entirety.

GOVERNMENT RIGHTS

This invention was made with Government support under Contract Number DE-AC0676RLO1830 awarded by the U.S. Department of Energy. The Government has certain rights in the invention.

BACKGROUND

The present invention relates to interrogation of an object with electromagnetic radiation, and more particularly, but not exclusively relates to determining dimensional and topographical information about a person's body.

Schemes from the common tape measure to visible light laser scanning have been employed to obtain measurements of a person's body. Unfortunately, these schemes often require a significant degree of mechanical intervention or preparation, such as the placement of a measuring device or marker on the person and/or removal of the person's clothing. Moreover, it is typically desirable to nonintrusively interrogate an object for dimensional information with less object handling, reduced interrogation time, and/or greater resolution relative to existing schemes. Another goal that is sometimes related to object mensuration is the desire to determine the topography of an object's surface. Thus, there is a demand for further contributions in this area of technology, including new ways to obtain dimensional and/or topographical information.

SUMMARY OF INVENTION

One embodiment of the present invention is a unique technique to obtain one or more body measurements of a person. Other embodiments include unique systems, devices, methods, and apparatus to determine dimensional, topographical, and/or image information about an object. Still other embodiments include unique ways to utilize such information.

In a further embodiment of the present invention, electromagnetic radiation interrogates an object to determine dimensional information about the object. This interrogation can include determining a measurement of one or more features at least partially covered by a substance that is penetrated by the electromagnetic radiation. In one form, the electromagnetic radiation is of a nonionizing type that can penetrate the clothing of a person to determine one or more body measurements corresponding to a skin surface that is at least partially covered by the clothing. In another form, the invention may be applied to determine dimensional information concerning a body surface that is not covered by clothing or the like.

Still another embodiment includes irradiating a body at least partially covered with clothing and detecting electromagnetic radiation returned from a surface of the body through the clothing in response to this irradiation. A measurement of the body is determined from the electromagnetic radiation that corresponds to this surface. The body can be of a person with the surface corresponding to the person's skin. In one preferred form of this embodiment, the electromagnetic radiation includes at least one frequency in a frequency range of about 200 Megahertz (MHz) to about 1 Terahertz (THz). In a more preferred form, the electromagnetic radiation is in a frequency range of about 1 Gigahertz (GHz) to about 300 GHz. In a most preferred form, the electromagnetic radiation is in a frequency range of about 5 GHz to about 110 GHz.

Yet a further embodiment of the present invention is directed to irradiation of an object to obtain data corresponding to a number of different images of the object. A topographical representation is determined from the data. This representation can be used to generate a desired output, such as one or more images of the object. In one preferred form, the electromagnetic radiation is in a frequency range of about 200 Megahertz (MHz) to about 1 Terahertz (THz). In a more preferred form, the electromagnetic radiation is in a frequency range of about 1 GHz to about 300 GHz. In a most preferred form, the electromagnetic radiation is in a range of about 5 GHz to about 110 GHz.

For another embodiment, a system includes an array to interrogate a person with electromagnetic radiation. One or more processors are included that respond to signals from the array to determine a body measurement of the person. The body measurement corresponds to a skin surface of the person that is at least partially covered by clothing during interrogation with the array. In one preferred form, the electromagnetic radiation includes one or more wavelengths in the range from about 300 micrometers ($\mu$m) to about 1.5 meters (m). In a more preferred form, the electromagnetic radiation includes one or more wavelengths in the range from about 2 millimeters (mm) to about 1 centimeter (cm).

Still another embodiment includes a device carrying one or more signals that comprise logic to operate one or more processors. This logic is operable to process a number of data sets each corresponding to a different portion of a body interrogated with electromagnetic radiation. The logic is further operable to provide a volumetric and/or topographical representation of the body from the data sets and determine one or more body measurements from such representation(s).

In yet another embodiment, a system includes at least one array to interrogate an object with electromagnetic radiation at one or more frequencies in a range of about 200 MHz to about 1 THz. Also included are one or more processors responsive to this array that are operable to: establish a number of data sets each representative of a three-dimensional image of a different one of a number of portions of the object; map the data sets to a volumetric representation of the object, the volumetric representation corresponding to a volume of the object defined by each of the portions of the object; and process the volumetric representation to provide an output. The system can further include a display device responsive to this output.

Another embodiment includes irradiating an object and detecting electromagnetic radiation reflected by the object in response to this irradiation. This electromagnetic radiation is in a frequency range of about 200 MHz to about 1 THz. Data determined from the electromagnetic radiation detection is used to generate a volumetric or topographical representation of the object. This representation can define at least one circumference of the object from which a circumferential measurement of the object can be determined.

Among other embodiments of the present invention is: providing a sensing array and one or more processors coupled to the array; interrogating an object with electromagnetic radiation from the array; generating data representative of the object from this interrogation with the one or more processors; and transmitting the data over a computer network to a remote site. The electromagnetic radiation has a frequency in a range of about 200 MHz to about 1 THz.

Further embodiments include a system, method, device, and/or apparatus to determine dimensional and/or imaging information about an object with electromagnetic radiation. In one preferred form, the electromagnetic radiation is selected from a frequency range of about 200 Megahertz (MHz) to about 1 Terahertz (THz). In a more preferred form, the electromagnetic radiation is in a frequency range of about 1 GHz to about 300 GHz. In a most preferred form, the electromagnetic radiation is in a range of about 5 GHz to about 110 GHz.

Accordingly, one object of the present invention is to provide a unique technique to obtain information through interrogation with electromagnetic radiation.

Another object is to provide a unique system, method, device, or apparatus to determine dimensional, topographical, image, and/or volumetric information about an object.

Other objects, embodiments, forms, features, advantages, aspects and benefits of the present invention shall become apparent from the detailed description and drawings included herein.

DETAILED DESCRIPTION

Figure 1:
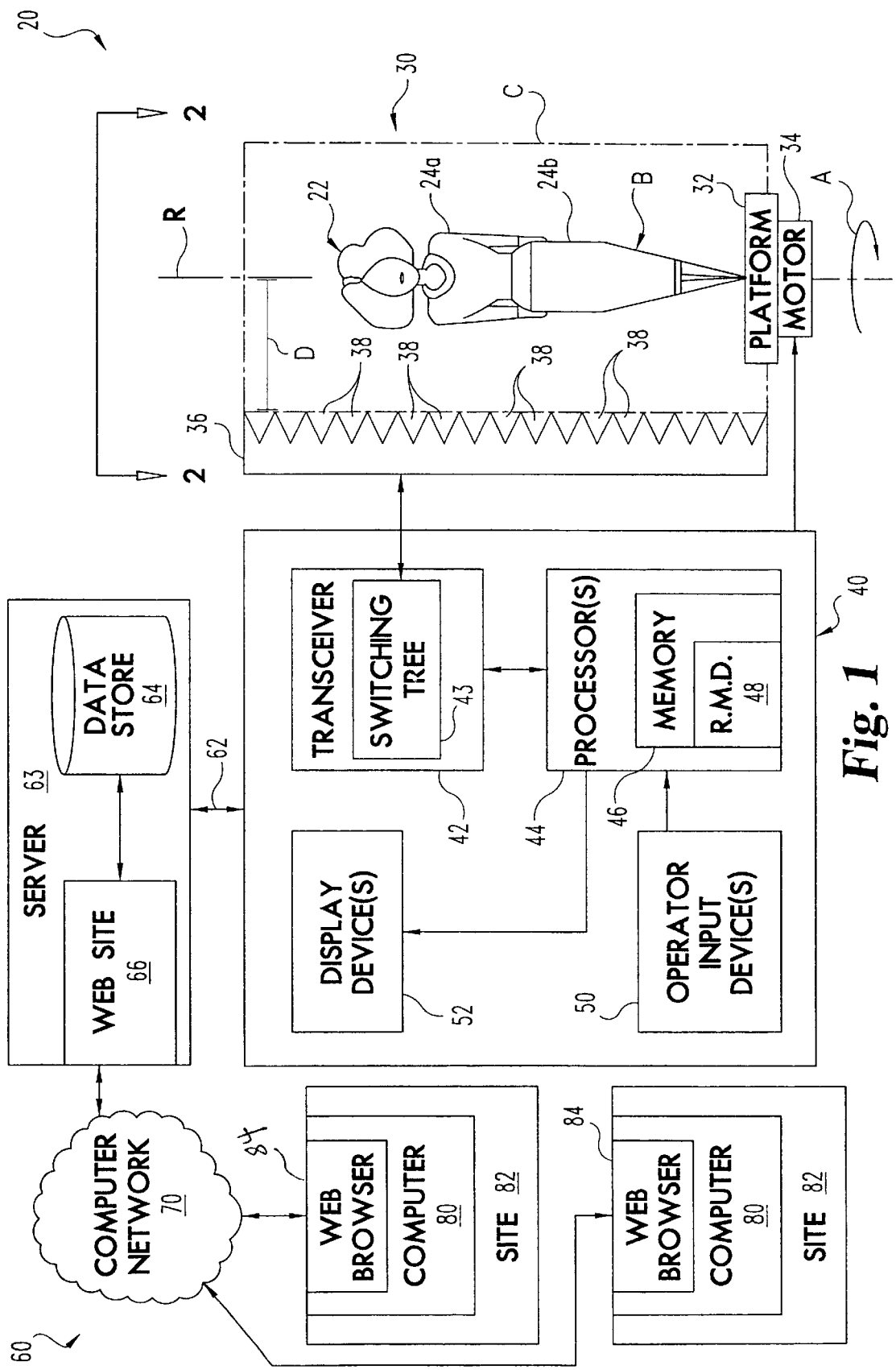
FIG. 1 is a partial, diagrammatic view of an interrogation system.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One nonlimiting form of the present invention includes an interrogation technique to obtain topographic data about a surface of an object that can be hidden by one or more layers, such as clothing, or exposed. The interrogation is performed with a scanner that emits electromagnetic radiation in frequency range including the millimeter and/or microwave wavelength bands. The data can be used to form a three-dimensional topographical representation of the surface, determine object dimensions, and/or render one or more images of the object. When applied to a clothed individual, the scanner is capable of discriminating between layers of clothing and identifying skin impressions (indentations) left by tight fitting clothing (e.g., socks, belts, undergarment bands and straps). This data can be of interest for apparel designers. Likewise, the scanner can be used to measure one or more features of an individual's body to fit clothing or select body-fitted equipment. Additionally or alternatively, the scanner can interrogate inanimate and animate objects residing on a person's body (even if covered by clothing), in clothing itself, and in baggage. These features can be desirable for certain security applications.

FIG. 1 illustrates system 20 of one embodiment of the present invention. In operation, system 20 determines dimensional and/or topographical information about an animate or inanimate object by illuminating it with electromagnetic radiation in the 200 Megahertz (MHz) to 1 THz frequency range and detecting the reflected radiation. The corresponding wavelength range includes the millimeter and microwave bands. Certain natural and synthetic fibers are often semi-transparent to such frequencies/wavelengths, permitting the detection and/or imaging of surfaces positioned beneath such materials. When the subject of interrogation is a clothed individual, dimensional information about portions of a person's body covered by clothing or garments can typically be obtained with system 20, as well as those portions that are not covered by clothing or garments.

As illustrated in FIG. 1, body B is in the form of a person 22 presented for interrogation by system 20. Person 22 is portrayed in a typical manner, being at least partially covered by garments or clothing designated by reference numerals 24a and 24b. Person 22 is positioned in scanning/illumination booth 30 of system 20. Booth 30 includes platform 32 connected to motor 34. Platform 32 is arranged to support person 22 or such other object desired to be examined with system 20. Motor 34 is arranged to selectively rotate about rotational axis R while person 22 is positioned thereon. For the orientation shown, axis R is approximately vertical, and person 22 is in a generally central position relative to axis R and platform 32.

Figure 2:
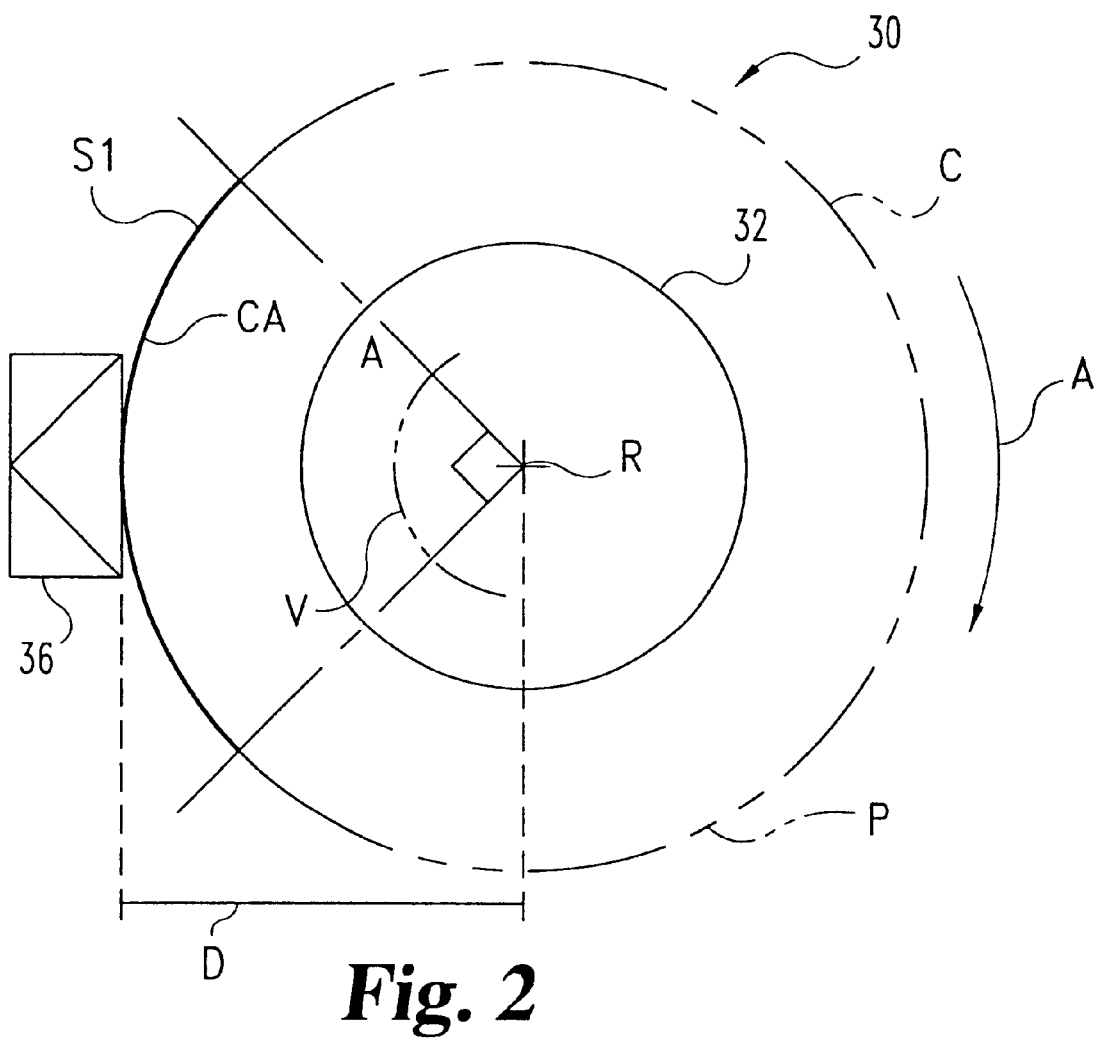
FIG. 2 is a partial, top view of the FIG. 1 system along the view line 2—2 shown in FIG. 1.

Booth 30 further includes a multiple element-sensing array 36. Referring additionally to the partial top view of FIG. 2, the relationship of platform 32 to array 36 is further illustrated. Axis R is generally perpendicular to the view plane of FIG. 2 and is represented by crosshairs. As motor 34 causes platform 32 to rotate about axis R, array 36 circumscribes a generally circular pathway P about axis R. Circular pathway P corresponds to an imaginary cylinder C with radius D. Radius D is the distance from axis R to array 36. In one preferred form, radius D is about 0.5 to about 2 meters. In a more preferred form, radius D is about 0.5 meters to 1.5 meters—corresponding to about a 1 meter to 3 meter diameter. Arrow A shown in FIGS. 1 and 2 represents the selective rotation of platform 32 about axis R.

Sensing array 36 includes a number of linearly arranged elements 38 only a few of which are schematically illustrated and specifically designed by reference numerals to preserve clarity. Elements 38 each operate to transmit or receive electromagnetic radiation within a selected bandwidth. Sensing array 36 is coupled to control and processing subsystem 40. Subsystem 40 includes transceiver 42 with switching tree 43 coupled to elements 38 of array 36. In one form, the position of array 36 relative to platform 32 is determined with one or more positional encoders (not shown) that are coupled to subsystem 40. In other forms, one or more different position tracking devices and/or techniques can be used.

Under the control of transceiver 42, individual elements 38 can be selectively activated with switching tree 43. Each element 38 is dedicated to transmission or reception. Elements 38 are arranged in two generally vertical columns arranged in a generally back-to-back relationship with one another. Elements 38 comprising one of the columns are dedicated to transmission and elements 38 comprising the other of the columns are dedicated to reception. The number of elements 38 in each column is in a range of about 200 to about 600 elements and spans a vertical distance of about 2 to 2.5 meters along axis R; however, in other embodiments, a different vertical span and/or number of elements can be utilized. Transceiver 42 can control switching tree 43 to irradiate body B with only one element 38 of the transmitting column at a time and simultaneously receive with one or more elements 38 of the receiving column. Transceiver 42 includes logic to direct successive activation of each element 38 of the transmitting column and the corresponding one or more elements 38 of the receiving column to provide a scan of a portion of body B along a vertical direction with array 36. The corresponding "down range" or "time-of-flight" information can be used to provide positional data about a corresponding portion of body B under interrogation (such as person 22). Further information about such arrangements is provided in commonly owned U.S. Pat. No. 5,859,609, which is hereby incorporated by reference.

In a preferred embodiment, transceiver 42 and elements 38 of array 36 are of a form suitable to transmit and/or receive electromagnetic radiation selected from the range of about one Gigahertz to about one Terahertz (about 1 GHz to about 1 THz), which corresponds to a free space electromagnetic radiation wavelength range of about 0.3 meter (m) to about 300 micrometers ($\mu$m). In another preferred embodiment, an impulse transceiver arrangement is utilized that generates frequencies in a range of about 200 MHz to about 15 GHz depending on the impulse width, which corresponds to a free space electromagnetic radiation wavelength range of about 1.5 m to about 0.02 m. In a more preferred embodiment, the frequency range is about 1 GHz to about 300 GHz with a corresponding free space wavelength range of about 0.3 meter to about 1 millimeter (mm). In a most preferred embodiment, the frequency range is about 5 GHz to about 110 GHz with a corresponding free space wavelength range of about 0.06 m to about 2.7 mm.

The transmission pathway for a given element 38 of the transmitting column can be selected to be about the same length as the transmission pathway for the corresponding element(s) 38 of the receiving column to simplify calibration. Nonetheless, in other embodiments, the transmission/reception arrangement can differ. For example, in one alternative embodiment, one or more elements 38 are used for both transmission and reception. In another alternative embodiment, a mixture of both approaches is utilized. Typically, the signals received from array 36 are downshifted in frequency and converted into a processible format through the application of standard techniques. In one form, transceiver 42 is of a bi-static heterodyne Frequency Modulated Continuous Wave (FM/CW) type like that described in U.S. Pat. No. 5,859,609 (incorporated by reference herein). Commonly owned U.S. Pat. Nos. 5,557,283 and 5,455,590, each of which are incorporated by reference herein, provide several nonlimiting examples of other transceiver arrangements. In still other embodiments, a mixture of different transceiver/sensing element configurations with overlapping or nonoverlapping frequency ranges can be utilized that may include one or more of the impulse type, monostatic homodyne type, bi-static heterodyne type, and/or such other type as would occur to those skilled in the art.

Transceiver 42 provides the data corresponding to the array signals to one or more processors 44 of subsystem 40. Processor(s) 44 can be comprised of one or more components of any type suitable to process the data received from transceiver 42, including digital circuitry, analog circuitry, or a combination of both. Processor(s) 44 can be of a programmable type; a dedicated, hardwired state machine; or a combination of these. For a multiple processor form; distributed, pipelined, and/or parallel processing can be utilized as appropriate. In one arrangement, an integrated circuit form of a programmable digital signal processor is utilized that is capable of at least 1 Gigaflop operation.

Memory 46 is included in processor(s) 44. Memory 46 can be of a solid-state variety, electromagnetic variety, optical variety, or a combination of these forms. Furthermore, memory 46 and can be volatile, nonvolatile, or a mixture of these types. Memory 46 can be at least partially integrated with processor(s) 44. Removable processor-readable Memory Device (R.M.D.) 48 is also included with processor(s) 44. R.M.D. 48 can be a floppy disc, cartridge, or tape form of removable electromagnetic recording media; an optical CD or DVD disc; an electrically reprogrammable solid-state type of nonvolatile memory, and/or such different variety as would occur to those skilled in the art. In still other embodiments, R.M.D. 48 is absent.

Subsystem 40 is coupled to motor 34 to selectively control the rotation of platform 32 with processor(s) 44 and/or transceiver 42. Subsystem 40 includes one or more operator input devices 50 and one or more display devices 52. Operator input device(s) 50 can include a keyboard, mouse or other pointing device, a voice recognition input subsystem, and/or a different system as would occur to those skilled in the art. Operator display device(s) 52 can be of a Cathode Ray Tube (CRT) type, Liquid Crystal Display (LCD) type, plasma type, Organic Light Emitting Diode (OLED) type, or such different type as would occur to those skilled in the art. In one form, at least a standard keyboard and mouse are included in input devices(s) 50, and at least one high-resolution color graphic display is included in display devices 52.

System 20 further includes communication subsystem 60 coupled to subsystem 40 by communication link 62. Subsystem 60 includes network server 63 coupled to computer network 70. Computer network 70 includes the internet. Communication link 62 can be provided in the form of one or more dedicated communication channels for subsystem 40, a Local Area Network (LAN), and/or a Wide Area Network (WAN), such as the internet. In other words, server 63 can be remotely located relative to subsystem 40 with computer network 70 providing link 62. Indeed, in one embodiment, server 63 is coupled to a number of remotely located subsystems 40 with corresponding booths 30. In still other embodiments, more than one server 63 can be coupled to a common booth 30 and subsystem 40 arrangement.

Server 63 is operable to communicate via the world wide web over network 70. Server 63 includes a data store 64 to collect data provided from subsystem 40 and is arranged to provide a web site 66 comprising one or more web pages of information. Computer network 70 communicatively couples a number of sites 80 together. Each site 80 includes a computer 82 arranged to communicatively interface with computer network 70 through web browser 84. Each computer 82 includes one or more operator input device(s) 50 and one or more operator output device(s) 52 as previously described for subsystem 40, that are not shown to preserve clarity. Device(s) 50 and 52 at each site 80 selectively provide an operator input and output (I/O) capability via web browser 84. Computer 82 can be in the form of a personal computer, computer workstation, another computer server, Personal Digital Assistant (PDA), and/or a different configuration as would occur to those skilled in the art. While only two user sites 80 are illustrated to preserve clarity, it should be understood that more or fewer can be coupled to computer network 70.

Collectively, server 63, computer network 70, and sites 80 provide an arrangement to remotely access and/or control subsystem 40 or booth 30. The interconnection of these components can be hardwired, wireless, or a combination of both. In other embodiments, an interconnection technique other than the internet could be alternatively or additionally utilized with the connection interfaces of server 63 and/or sites 80 adapted accordingly. For example, sites 80 and server 63 could be coupled by a LAN, dedicated cabling, and the like. In one alternative embodiment, server 63 is an integral part of subsystem 40. For still other embodiments, server 63, network 70 and sites 80 are absent. Indeed, removable memory device 48 can be used to alternatively or additionally transfer data between subsystem 40 and other computing/processing devices.

Figure 3:
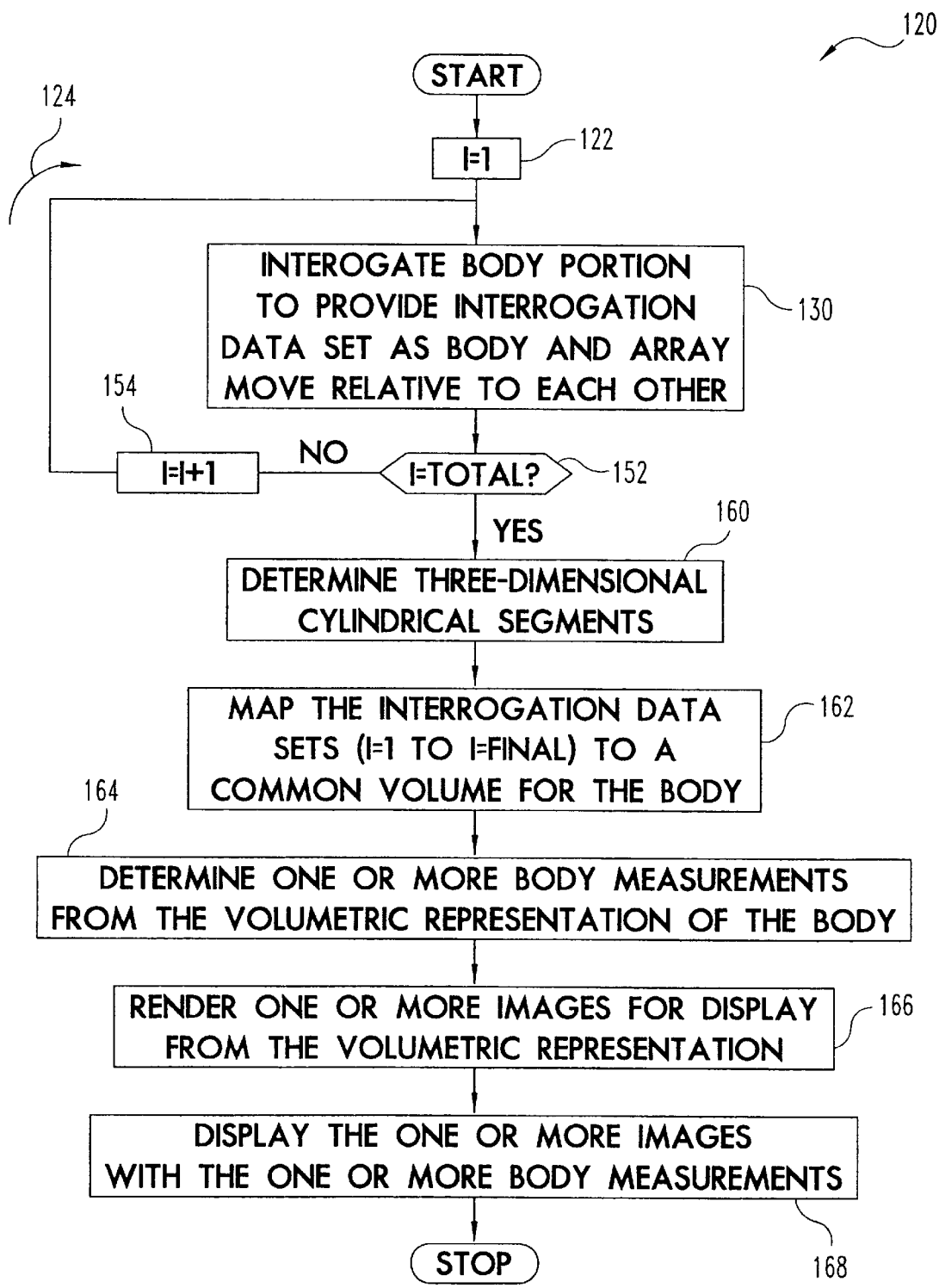
FIGS. 3 and 4 are flow charts illustrating one procedure for operating the system of FIG. 1.

Referring additionally to FIG. 3, one mode of operating system 20 is illustrated as procedure 120. Procedure 120 is performed to provide a three-dimensional topographical representation of Body B with system 20. Various body measurements can be determined from this representation with system 20. Procedure 120 begins with initialization operation 122 that sets interrogation index "I" to one (I=1). From operation 122, procedure 120 enters interrogation loop 124 beginning with interrogation subroutine 130. Interrogation subroutine 130 interrogates a portion of body B within a field of view of array 36 as body B rotates on platform 32. Index I is an integer index to the number of different interrogation subroutines 130 performed as part of procedure 120.

Figure 4:
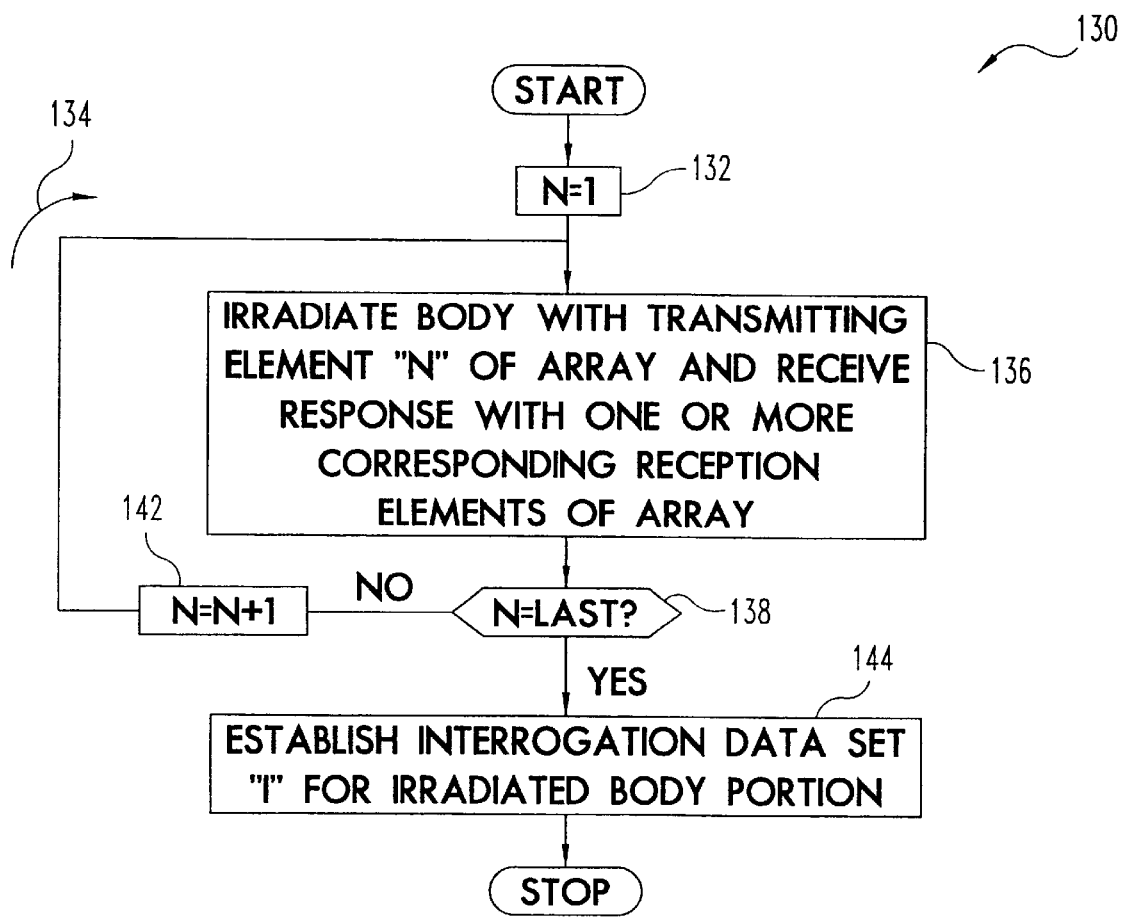

Referring to FIG. 4, interrogation subroutine 130 is further illustrated. Subroutine 130 begins with initialization operation 132 in which transmission index N is set to one (N=1). From operation 132, element sequencing loop 134 is entered, beginning with transmission/reception operation 136. Index N is an integer index to the number of transmission/reception operations 136 performed during subroutine 130.

In operation 136, a portion of the body in the field of view of a transmitting element number "N" of array 36 is irradiated with electromagnetic radiation and one or more corresponding reception elements collect the reflected electromagnetic radiation in response to the transmission. The transmitting and reception elements are selected by logic of transceiver 42 with switching tree 43 as previously described. From operation 136, subroutine 130 proceeds to conditional 138, which tests whether transmitting element number "N" is the last element needed to transmit (N=LAST?); where LAST is the total number of the transmitting elements to be activated by transceiver 42. In one form, for each execution of subroutine 130, transmitting element "N" sweeps through a selected frequency range twice, and the corresponding backscatter information for each of the two sweeps is received with a different reception element. The transmitting elements can be staggered relative to the reception elements such that transmitting element N aligns with a point between the two reception elements along a common axis of the array. U.S. Pat. No. 5,557,283 (incorporated by reference) describes an example of this arrangement of transmitting and reception elements. In other forms, a different technique can be utilized involving more or fewer sweeps, different types of sweeps, and/or different transmitting/reception orientations and numbers.

If the test of conditional 138 is negative (N<LAST), then increment operation 142 is performed, incrementing N by one (N=N+1). Loop 134 returns from operation 142 to transmission/reception operation 136 for execution with the transmitting/receiving subset of elements 38 corresponding to the new, incremented value of N from operation 142. In this manner, elements 38 are activated in a vertical path along array 36 with transceiver 42 to provide data along a contiguous region of body B.

The resolution of interrogation information obtained with transceiver 42 can be enhanced by linearly sweeping through a selected ultrawide frequency range during each operation 136. In one preferred form, transceiver 42 sweeps through a range of at least 10 GHz for each execution of operation 136. This sweep can occur, for example, over a range of about 10 GHz to about 20 GHz. In a more preferred form, transceiver 42 and elements 38 are arranged for a sweep range of 16 GHz. This sweep can occur, for example, over a range of about 24 GHz to about 40 GHz. In one most preferred form, the ultrawide sweep range is selected such that the range resolution is generally the same as the lateral resolution. For these forms, elements 38 are selected to be of a type with a frequency response suitable for the selected sweep range, including, but not limited to the taper slot or end-fire antenna type. In another form, the transmitter can sweep through a given frequency range (such as 10 GHz to 20 GHz) in a pseudo-random order—sometimes known as frequency hopping.

Loop 134 is repeated LAST number of times, sequencing through the desired transmitting/receiving elements 38 of array 36 under the control of transceiver 42. When the test of conditional 138 is true, the affirmative branch proceeds to data operation 144. Data resulting from the execution of operation 136 is provided by transceiver 42 to processor(s) 44. In data operation 144, an interrogation data set is established for the information gathered through the repeated execution of operation 136 from N=1 through N=LAST. This data set corresponds to the current value of integer index I and the body portion illuminated during these executions. Initially, the interrogation data set can be accumulated and organized by transceiver 42, processor(s) 44 or both; and then stored in memory 46 for further processing by processor(s) 44 as described in connection with the remainder of procedure 120. From operation 144, subroutine 130 returns to the next stage of procedure 120.

Referring back to FIG. 3, procedure 120 continues with conditional 152 that tests whether the final value of index I has been reached (I=TOTAL?); where TOTAL is the total number of desired executions of loop 124 (and subroutine 130) for process 120. If the test of conditional 152 is negative (I<TOTAL), process 120 proceeds to increment operation 154 to increment index I by one (I=I+1). Loop 124 then returns to subroutine 130 for the next execution until I is incremented to be equal to TOTAL.

With the execution of loop 124 TOTAL number of times, TOTAL number of interrogation data sets are stored in memory 46. When the performance of subroutine 130 is relatively fast compared to the rotational speed of platform 32, each of the interrogation data sets corresponds to a general vertical portion of body B. In one such example, the following parameters apply:
(a) platform rotational speed of 20 seconds per revolution;
(b) 600 executions of loop 134 for each execution of subroutine 130; and
(c) execution time of subroutine 130 of no more than 12 milliseconds.

For the indicated rotational speed in (a), the platform rotates through less than one quarter (¼) of a degree in the time it takes to execute subroutine 130. Accordingly, each execution of subroutine 130 and the corresponding interrogation data set generally approximates a vertical body portion. In other examples for which the rotational speed is relatively fast compared to subroutine 130 execution, a body portion corresponding to a helical or spiral path along the body results that can also be processed in accordance with the teachings of the present invention by taking into account his more complex spatial relationship.

When the test of conditional 152 is true, procedure 120 continues with cylindrical segmentation operation 160. In operation 160, the interrogation data sets are processed with processor(s) 44 to generate a number of cylindrical image data sets that each correspond to an arc segment of cylinder C. Referring to FIG. 2, arc segment S1 subtends a viewing angle V of about 90 degrees with respect to body B. Arc segment S1 defines a cylindrical aperture CA that extends along axis R. The image data set corresponding to arc segment S1 represents the three-dimensional surface of body B that is reflective with respect to the selected electromagnetic radiation, as if viewed through cylindrical aperture CA. In one convenient form, the image data set is defined in terms of cylindrical coordinates, although any three-dimensional coordinate system can be used. Each image data set is determined from the interrogation data gathered for the corresponding arc segment by processor(s) 44. Reference is made to commonly owned U.S. Pat. No. 5,859,609 (incorporated herein by reference) for further description about the determination of cylindrical image data.

Figure 5:
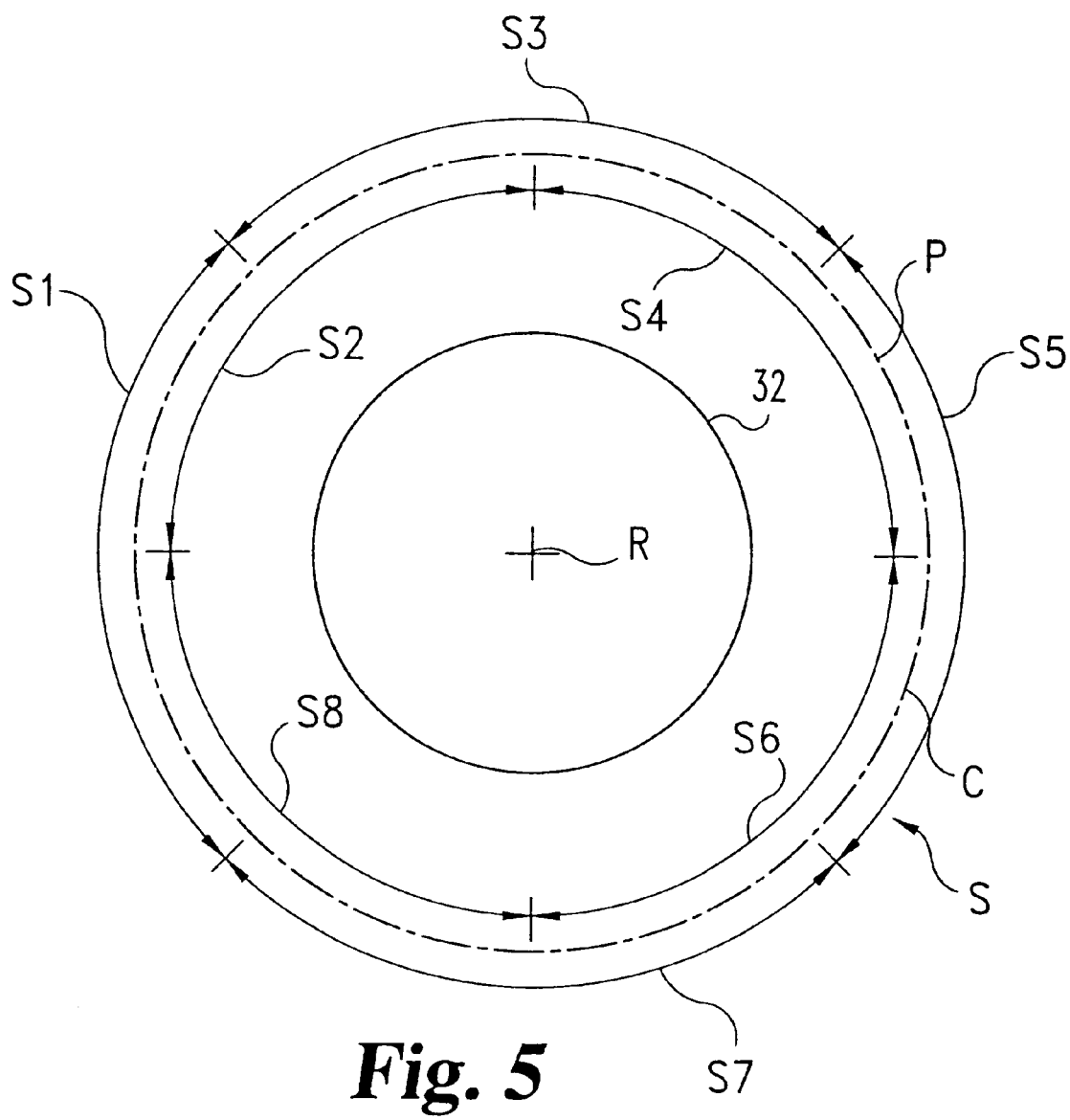
FIG. 5 is a schematic, top view of the system of FIG. 1 illustrating a number of overlapping arc segments.

During operation 160, cylindrical image data sets are determined for a number of arc segments about axis R that collectively circumscribe body B. In FIG. 5, eight overlapping arc segments S1, S2, S3, S4, S5, S6, S7, and S8 (collectively segments S) are illustrated with respect the generally circular pathway P and corresponding cylinder C. Segments S1, S3, S5, and S7 are schematically represented by double-headed arrows slightly to the outside of path P and segments S2, S4, S6 and S8 are schematically represented by double-headed arrows slightly inside path P to preserve clarity. In FIG. 5, segments S each correspond to a viewing angle of about 90 degrees, and each one overlaps two others by about 45 degrees. It should be understood that each different segment S corresponds to a representation of a different portion of body B. In other embodiments, the viewing angle can differ and/or may be nonuniform from one arc segment S to the next. Alternatively or additionally, overlap may be intermittent or absent.

Procedure 120 continues with mapping operation 162. In operation 162, the image data obtained for the circumscribing arc segments S are mapped by processor(s) 44 to a common surface for body B, which is turn defines a common volume of body B. Operation 162 can include reconciling a data point for one of the arc segments S for a given location that differs by a threshold amount from the data point of the same location for another of the arc segments S. In one embodiment, an averaging technique is used and intermediate data points are interpolated. In another embodiment, a weighting function is utilized that progressively reduces the contribution of a data point as the distance of that data point from the midpoint of the corresponding arc segment S increases. The cylindrical data sets are preferably combined incoherently (after computing the magnitude) to reduce undesirable phase interference in the images. Operation 162 provides a volumetric representation of body B bounded by its surface(s) about axis R that are reflective with respect to the electromagnetic radiation used for the interrogations of subroutine 130. This representation includes topographic information about such surface(s).

From operation 162, one or more measurements of body B are determined with processor(s) 44 in operation 164. For this determination, a reference unit corresponding to the desired measurement can be provided on platform 32, a background panel, or by a different means as would occur to those skilled in the art. This reference is used to quantify the desired measurement in terms of desired units.

In one application, body measurements correspond to those desired to size clothing for person 22. For this application, the interrogating electromagnetic radiation is selected to be generally transparent to and/or penetrate clothing 24a, 24b to provide lineal body measurements that correspond to the skin surface of person 22—including skin surfaces beneath clothing 24a and 24b. The selection of electromagnetic radiation frequency and/or frequency sweep range is made to provide the desired resolution of the body measurements.

Commonly, body measurements to fit clothing include circumferences of the neck, chest, waist, and/or hip region. Other lineal or distance measurements can include inseam, sleeve, and/or torso lengths. Still further measurements include head, breast, thighs, palm and/or foot girth for the purposes of fitting hats, brassieres, pants, gloves and/or footwear, respectively. Besides clothing, measurements of an individual can be used in other applications, such as ergonomic product design, prosthetics, and the representation/prediction of a change in appearance that might occur with weight loss or gain, cosmetic surgery, and the like.

In still other applications, measurements may be made of inanimate objects for many other purposes, including, but not limited to: analysis of the contents of an object having an outer layer that is penetrated by the selected electromagnetic radiation, determining one or more dimensions of an object to make or select object packaging, assessing shipping costs based on object dimensions, and the like. The measurement/quantification of individuals and/or inanimate objects using the teachings of the present invention can be of a surface area and/or volume as an alternative or addition to lineal measurements.

Procedure 120 proceeds from operation 164 to operation 166. In operation 166, one or more images are determined with processor(s) 44 from the volumetric/topographical representation of body B determined in operation 162. Operation 166 renders one or more two-dimensional images from the data representing the volume of body B by performing a two-dimensional parallel ray projection from a desired viewing angle. Along each parallel ray, the intensity is attenuated in proportion to the data it encounters in the representation. After attenuation, the maximum voxel intensity is selected to represent an image pixel intensity for the corresponding ray. The attenuation factor is adjusted so that the back surface of the representation does not contribute to the rendering. The two-dimensional rendering can be displayed using device(s) 52 as appropriate.

In one embodiment, a number of two-dimensional images from different viewing angles are rendered from the volumetric/topographical representation. These images can be presented in a selected sequence to provide an animation of body B. In one form, a sequence of about 32 to about 64 generally evenly spaced views about axis R are used to generate a rotating animation of body B about axis R.

From operation 166, procedure 120 continues with operation 168. In operation 168, one or more measurement indicators are also displayed that overlay one or more body images. In one embodiment, the displayed image of a person can be adjusted to hide/conceal body features to which a privacy objection might be made. Alternatively, the rendering can include a schematic body image similar to a mannequin in appearance.

Figure 6:
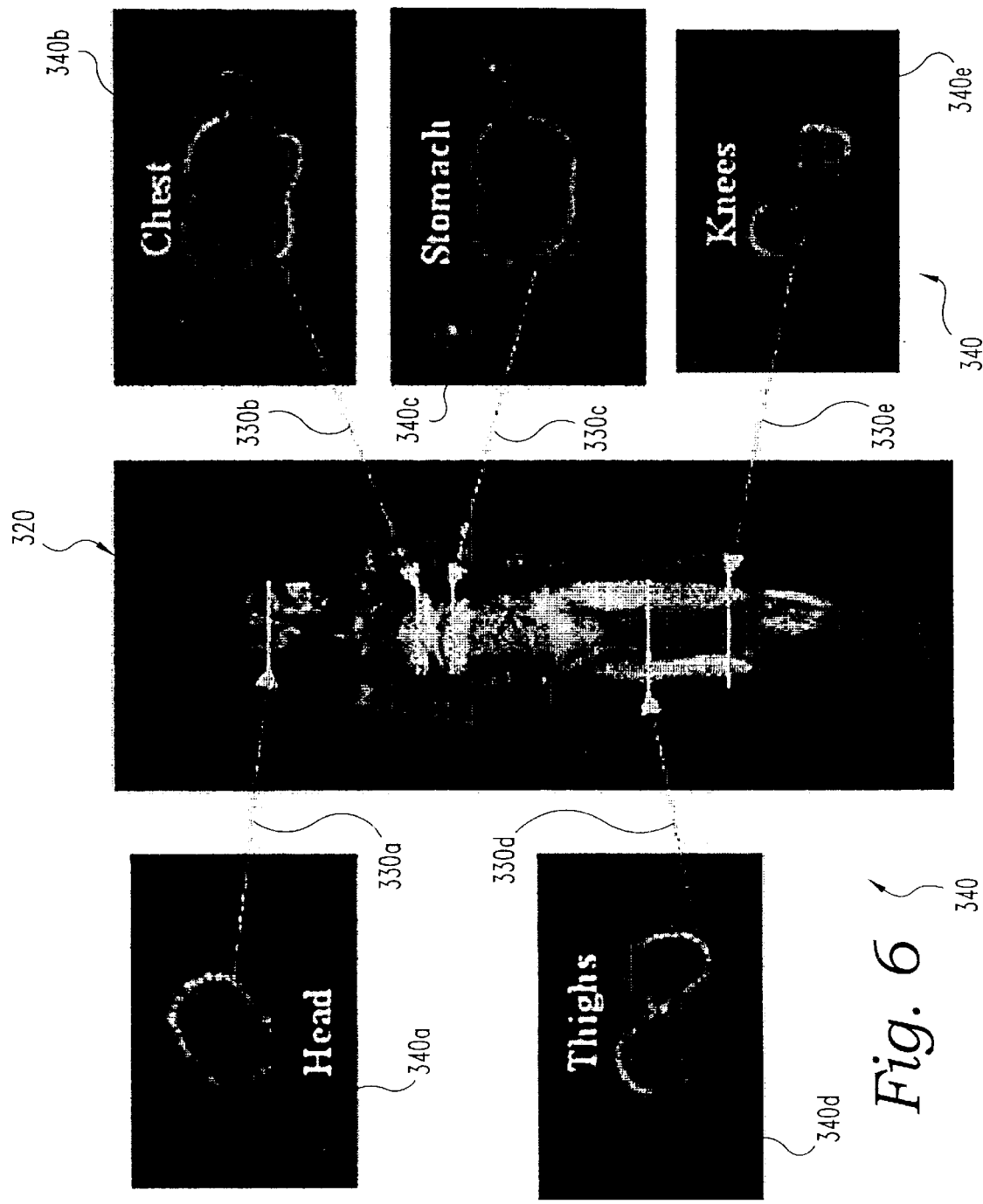
FIG. 6 is a computer-generated image provided in accordance with the procedure of FIGS. 3 and 4.

Alternatively or additionally, the volumetric/topographical representation of body B can be displayed as a number of sectional images. FIG. 6 presents computer-generated images determined from an experiment that was performed using an arrangement to simulate system 20. Image 320 corresponds to a front viewing angle of a clothed person; where the person's clothing is generally transparent to the interrogating electromagnetic radiation. For image 320, indicator lines 330a, 330b, 330c, 330d, and 330e correspond to various sectional views 340 that are more specifically designated head sectional view 340a, chest sectional view 340b, stomach sectional view 340c, thigh sectional view 340d, and knee sectional view 340e; respectively. Image 320 and sectional views 340 were determined from a volumetric/topographical representation obtained in accordance with procedure 120 using an ultrawide sweep range of 24 GHz to 40 GHz for each activation of an array element. Eight arc segments S were processed for this experiment in an arrangement like that represented in FIG. 5. It should be appreciated that this topographic representation defines a number of different circumferences of the depicted body, such as those represented by sectional views 340. In still other embodiments, display of body images may be absent. Alternatively or additionally, the information gathered with subsystem 40 is sent via computer network 64 to one or more remote sites 80. Sites 80 can perform some or all of the data processing represented by operations 160, 162, 164, 166, and/or 168 in lieu of processor(s) 44. In one process, a clothed individual is nonintrusively scanned by booth 30 and the measurement(s), image(s), animation, and/or topographical information of the individual's body is sent via server 63 and network 64 to a designated computer 82. From this computer 82, the measurement information can be sent via network 64 to one or more e-commerce clothing suppliers or other clothing business to electronically order or manufacture clothing of the desired size and style. Alternatively or additionally, the topographical information can be used to automatically generate by computer or otherwise custom two-dimensional (2-D) patterns for apparel manufacture.

For procedure 120, transceiver 42 and processor(s) 44 include logic to perform the various operations described. This logic can be in the form of software programming instructions, firmware, and/or of a hardwired form, just to name a few. Furthermore such logic can be in the form of one or more signals carried by, on, or with memory 46, R.M.D. 48, and/or one or more parts of computer network 70. In one example, logic signals to perform one or more operations is transmitted to or from processor(s) 44 via network 70. Alternatively or additionally, programming for processor(s) 44 is transported or disseminated through R.M.D. 48 and/or one or more other storage devices.

Figure 7:
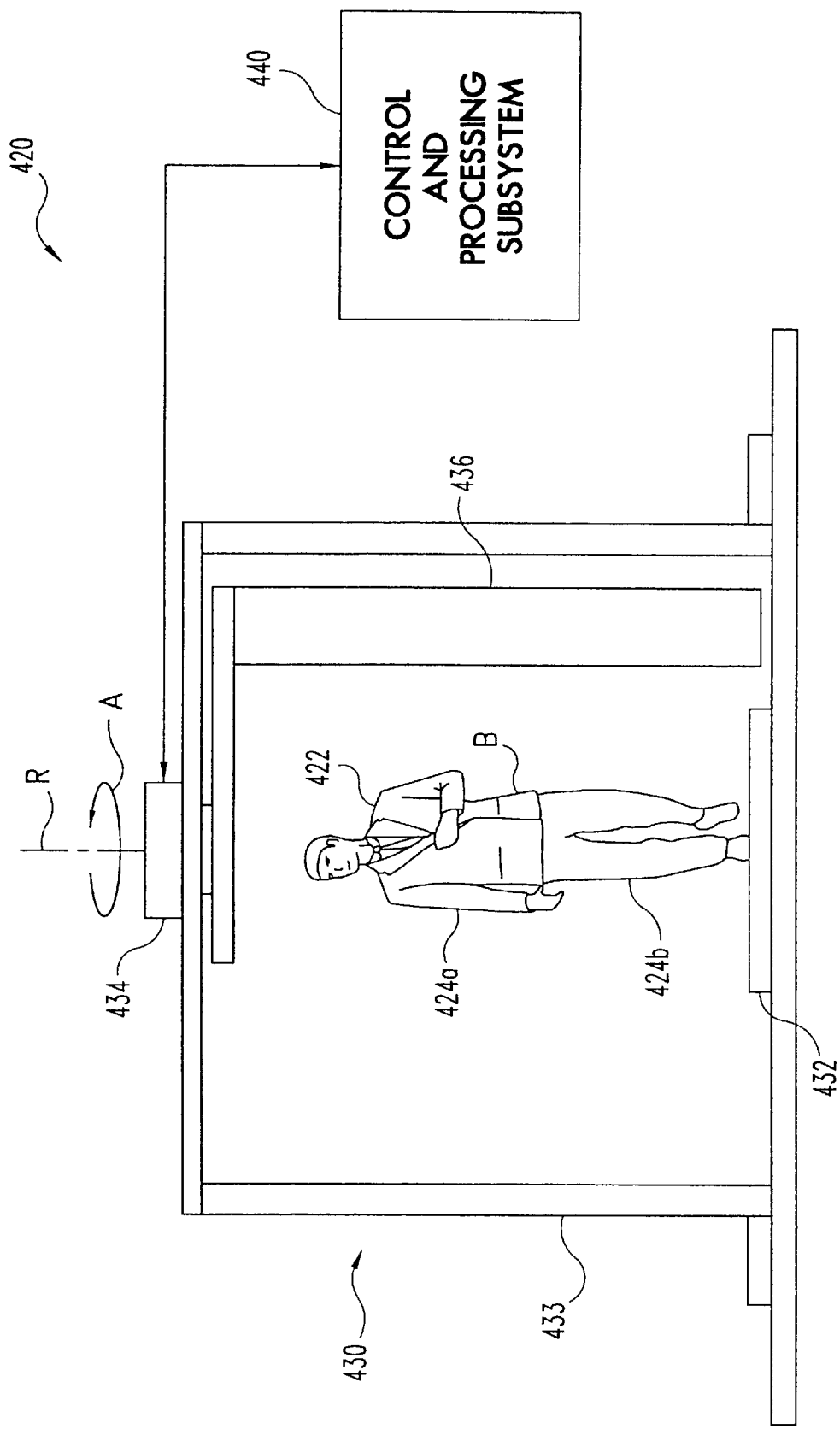
FIG. 7 is a partial, diagrammatic view of another interrogation system.

FIG. 7 illustrates interrogation system 420 of another embodiment of the present invention. System 420 illuminates body B with selected electromagnetic radiation in the manner described in connection with system 20. For system 420, body B is in the form of person 422 wearing clothing articles 424a and 424b. As in previously described embodiments, system 420 can be used to interrogate inanimate objects as well.

System 420 includes scanning booth 430 coupled to control and processing subsystem 440. Scanning booth 430 includes stationary platform 432 arranged to support body B and frame 433 to support motor 434 coupled to array 436. In contrast to the platform rotation of booth 30, scanning booth 430 selectively rotates array 436 about rotational axis R and platform 432 during interrogation. For this arrangement, array 436 follows a generally circular pathway to provide a corresponding imaginary cylinder about platform 432. In one form suitable for scanning a person in the standing position, the radius of this cylinder is about 1 meter. Array 436 is otherwise configured the same as array 36.

In system 420, subsystem 440 is configured the same as subsystem 40 of system 420 and is likewise arranged to perform procedure 120. However, during the performance of procedure 120, the operation of subsystem 440 accounts for the movement of array 436 relative to platform 432 instead of the movement of platform 32 relative to array 36. System 420 can include one or more encoders (not shown) operatively coupled to subsystem 440 and/or other devices/techniques to track the position of array 436 relative to platform 432. System 420 can further include a communication subsystem (not shown) the same as subsystem 60 to remotely communicate with subsystem 440. Like previously described embodiments, system 420 is used to determine measurement, topographical, image, animation, and/or three-dimensional volume information about body B.

Figure 8:
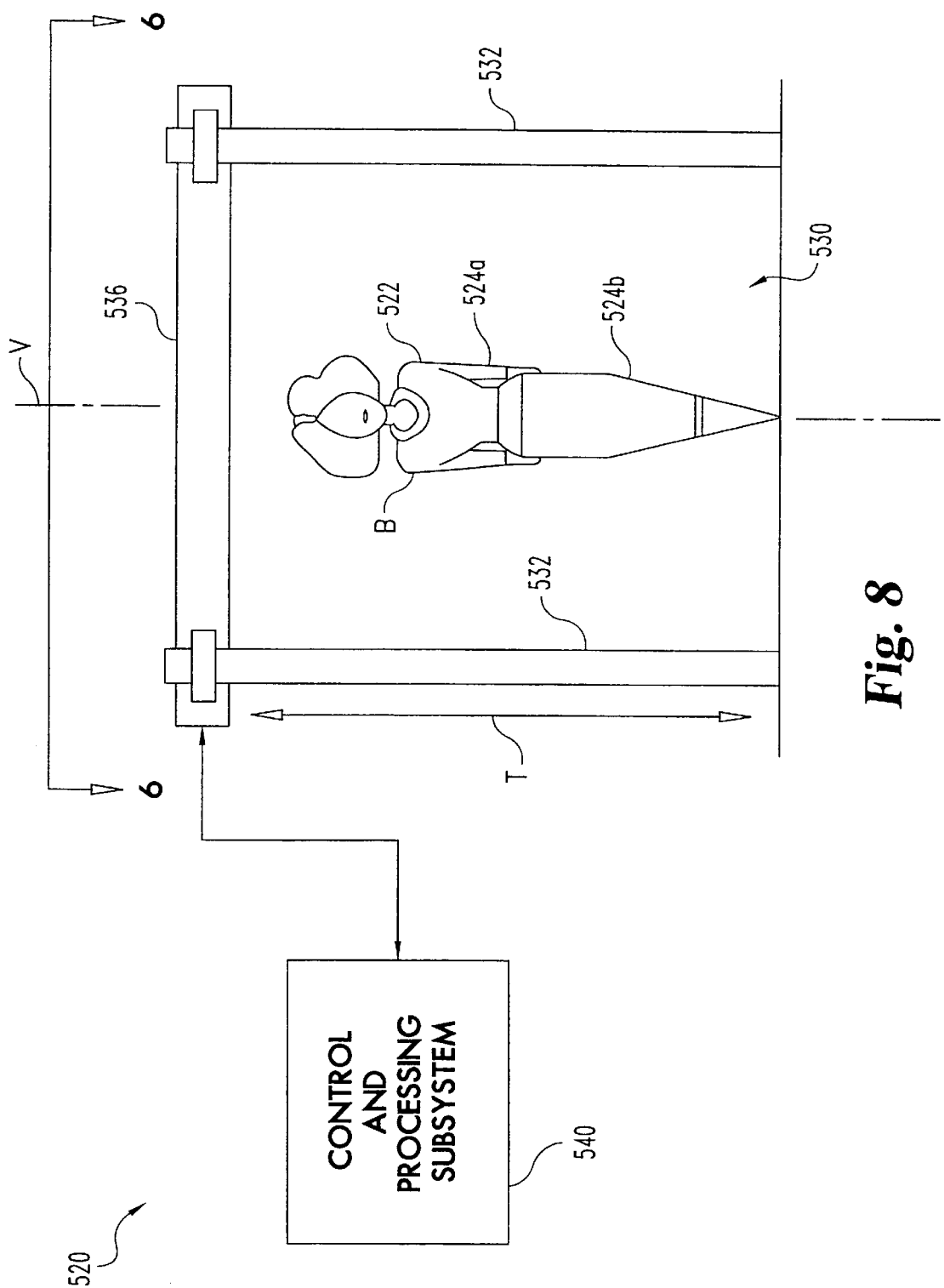
FIG. 8 is a partial, diagrammatic view of yet another interrogation system.

FIG. 8 illustrates electromagnetic radiation interrogation system 520 of yet another embodiment of the present invention. System 520 illuminates body B with selected electromagnetic radiation of the type previously described. For system 520, body B is in the form of person 522 wearing garments/clothing designated by reference numerals 524a and 524b. As in previously described embodiments, system 520 can be used to interrogate animate or inanimate objects.

System 520 includes scanning booth 530 coupled to control and processing subsystem 540. Scanning booth 530 includes frame 533 arranged to receive body B and support array 536. In contrast to the linear arrays 36 and 436 of previously described systems 20 and 420, array 532 is arranged as a ring or hoop generally centered with respect to centerline vertical axis V. A number of electromagnetic radiation transmitting/receiving elements are arranged in a generally circular pathway along the ring. These elements operate to interrogate body B with electromagnetic radiation including one or more wavelengths in the millimeter, microwave, and/or adjacent wavelength bands. Array 536 is arranged for translational movement along axis V to scan body B as represented by arrow T. One or more motors or other prime mover(s) (not shown) are utilized to selectively move array 536 along axis V.

Figure 9:
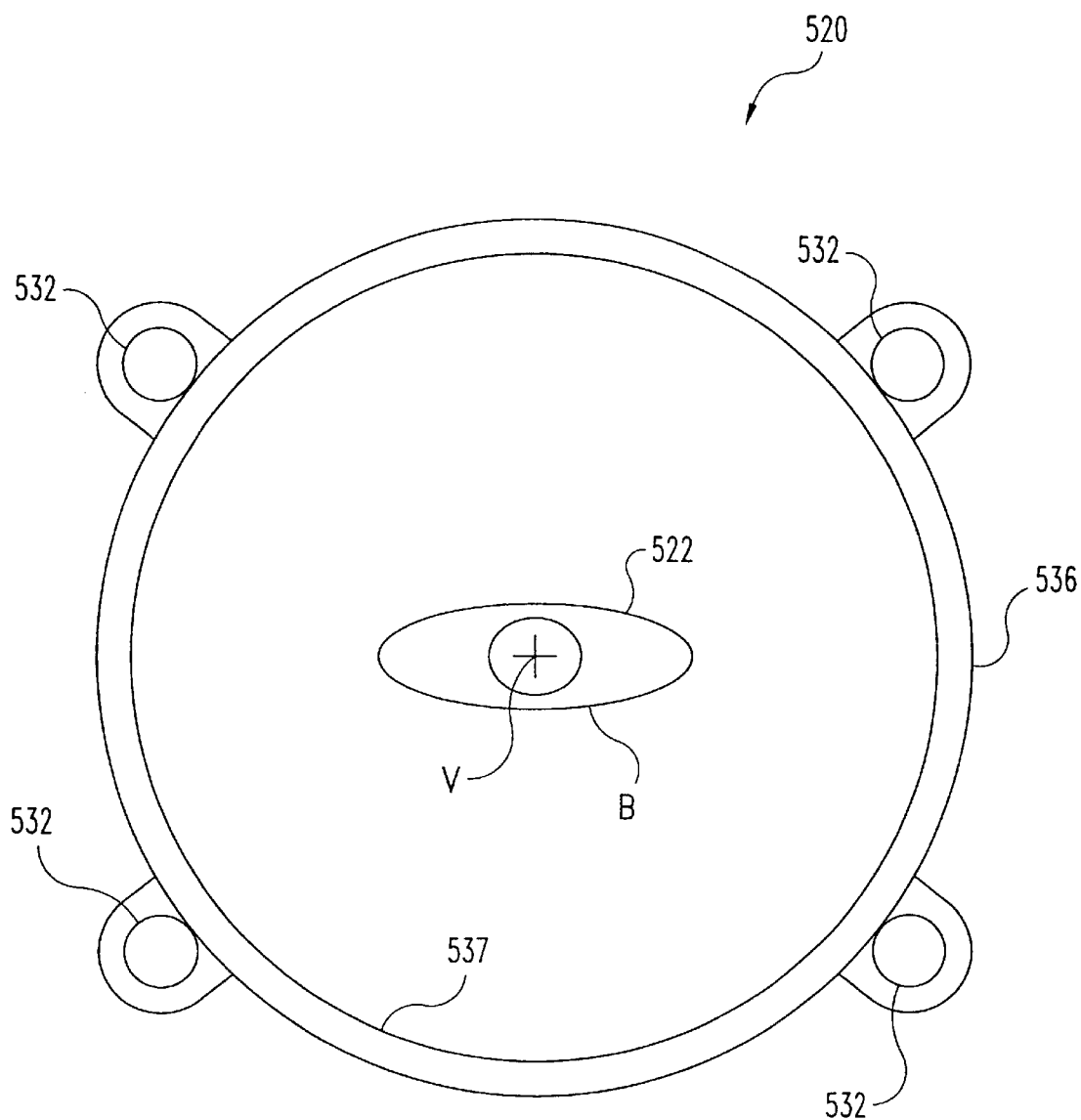
FIG. 9 is a partial, top view of the system of FIG. 8.

Referring further to the partial top view of FIG. 9, array 536 is sized with opening 537 to receive body B therethrough as array 536 moves up and down along axis V. In FIG. 9, axis V is generally perpendicular to the view plane and is represented by crosshairs. With the vertical motion of array 536, an imaginary cylinder is defined about body B in accordance with the circular path defined by the array ring; however, neither body B nor array 536 is rotated relative to the other, instead translational movement of array 536 is used to scan body B vertically.

Subsystem 540 is configured the same as subsystems 40 and 440 and is operable to perform procedure 120, except that processing of subsystem 540 is adapted to account for the vertical movement of array 436 instead of rotational movement. System 520 can further include a communication subsystem (not shown) the same as subsystem 60 to remotely communicate with subsystem 440. Like previously described embodiments, system 520 is used to determine measurement, image, animation, topographical, and/or three-dimensional volume information about body B.

Compared to array 36, a larger number of transmitting/receiving elements is typically needed for array 536 to have a comparable resolution to previously described embodiments. In one comparison, between 500 and 2000 transmitting/receiving elements would be desired for array 536 versus 200 to 600 for array 36 for comparable resolution, depending on the frequency band selected. However, under appropriate conditions, scanning booth 530 can perform a scan substantially faster than booth 30. In one nonlimiting example, the scan time for booth 30 is in a range of about 10 to 20 seconds versus about 2 to 5 seconds for scanning booth 530.

In a further embodiment of the present invention, the body undergoing interrogation and the array both move. In one such example, array elements are arranged in an arc segment that can move vertically while the body rotates. In another example, both the array and body rotate. The processing of interrogation data can be adjusted for these different motion patterns using techniques known to those skilled in the art.

In another embodiment, the interrogation and corresponding topographic representation do not correspond to the full circumference of the body undergoing interrogation. Instead, the segment of interest can be less than 360 degrees. For such embodiments, the topographic representation can still be determined by combining data corresponding to two or more different cylindrical arc segment apertures. In a clothing sizing application, the inseam, sleeve, and/or torso length measurements can be made using less than a full 360 degree volumetric representation. Alternative or additionally, less than the full height, width, and/or length of the body may be scanned in alternative embodiments. For such alternatives, the array size and/or scanning pattern can be correspondingly adjusted. In other applications, views and/or dimensions of interest can also be based on data that accounts for less than all the surfaces of the object under investigation.

In still other embodiments, a topographic representation provided in accordance with the present invention can be utilized for different purposes in addition or as an alternative to mensuration. In one example, the topographic representation can be used to detect concealed items. For one form of this application, the scanning booth platform can be comprised of a material, such as an organic thermoplastic or thermoset polymer, that permits the interrogation in or beneath the soles of shoes where weapons can sometimes be hidden. In another example, a three-dimensional likeness is generated from the topographic representation to perform further analysis relating to the corresponding person or object.

In one further embodiment, a topographical representation is obtained in accordance with procedure 120 and/or system 20, 420, or 520 to identify an individual. One form of this embodiment includes a technique to control access to a restricted area, comprising: scanning an individual attempting to gain access to the restricted area; determining a topographical representation of the individual from the scan; comparing one or more aspects of this representation, such as one or more relative body dimensions, to data stored for those permitted access to the restricted area; and allowing access to the restricted area by the individual if there is a match within a desired degree of error. The determination of a match can be used to activate a portal, gate, or other access control device. In one variation of this embodiment, one or more other biometrics (such as a fingerprint, palm print, retina image, vocal pattern, etc.) of the individual are compared in addition to the topographical representation related data as part of the determination of whether to allow access. The body dimension(s) used for identification can be changed for each access to reduce the likelihood that the access control measures will be circumvented. Such embodiments can be provided as a method, apparatus, system, and/or device.

In still a further embodiment, topographical representation information can be used for profiling. One nonlimiting example includes: scanning an individual to obtain topographical information; comparing this information to a database of topographical information for known terrorists or other undesirable parties; and taking further action to screen access of the individual to a sensitive area if the comparison indicates an unacceptable degree of similarity. This action can be taken irrespective of whether a concealed object, such as a weapon, is indicated by the scan. Various forms of this embodiment include methods, systems, apparatus and/or devices.

Another embodiment directed to an identification technique includes: scanning passengers of a commercial transportation vehicle, such as a commercial aircraft, for identifying topographical information; and in the event the vehicle is later involved in an accident resulting in injury or death, identifying one or more passenger bodies or body parts using the information. If a seating arrangement is known for the vehicle, the information for each passenger can be correlated to this arrangement to assist with identification. The scanning can be performed with the nonintrusive interrogation methods of the present invention as part of the vehicle boarding process. Such embodiments can be provided in the form of a method, apparatus, system, and/or device.

For yet a further embodiment, scanned topographical information regarding an individual is stored in a portable storage device, such as a "smart card." This device can be used for identification purposes and/or to customize equipment to the individual. One nonlimiting example directed to customization includes establishing an interface between the device and a vehicle and automatically adjusting a vehicle seat or other vehicle equipment to the individual's body dimensions and/or shape based on the information. This embodiment can be in the form of a method, apparatus, system, and/or device.

Still other embodiments of the present invention use procedure 120 and/or one or more of systems 20, 420, or 520 to provide at least one topographical representation for use in a virtual space or computer-defined domain. One such embodiment includes: scanning an individual to generate a corresponding topographical representation; generating a three-dimensional visualization of the individual with a computer based on the representation; and incorporating the visualization into a sequence of computer-generated images to provide a likeness of the individual. This likeness can be animated in a manner consistent with the images. The sequence of images can be provided in the context of a game, a virtual reality process, and/or a movie, to name just a few examples. Such embodiments can be provided in the form of method, apparatus, system, and/or device.

Another embodiment directed to a computer domain/virtual space application, includes: interrogating a number of objects to obtain a corresponding number of topographical representations and determining one or more relationships between the objects by analysis of the representations with a computer. One form of this embodiment includes: scanning several pieces of wreckage resulting from a vehicle accident, such as an aircraft accident, to provide a corresponding number of topographical representations; and arranging the representations relative to one another with a computer to analyze the accident. This form can include orienting the pieces in different spatial relationships relative to one another in a computer domain to at least partially reconstruct the vehicle; removing apparent deformities of one or more of the pieces in a computer domain to assist with reconstruction; visualizing one or more of the pieces with a computer; generating a record in a computer of the time and place of discovery of each of the pieces; and/or detecting metal fragments or other radar reflective material at least partially embedded in a radar transparent/translucent material. This embedded material can be indicative of an explosion. Such embodiments can be provided as a method, apparatus, system, and/or device. Yet other embodiments are directed to other applications as would occur to those skilled in the art.

In a further embodiment of the present invention, a topographic representation of an object is determined from electromagnetic radiation interrogation that combines two or more cylindrical segment data sets. This unique technique can provide topographical data defining one or more circumferences of an object about an axis with high resolution. In contrast, conventional cylindrical imaging schemes do not combine cylindrical segment data—instead being rather limited to the utilization of a much larger number of uncombined images to provide an animated presentation.

All publications and patent applications cited in this specification are herein incorporated by reference as if each individual publication or patent application were specifically and individually indicated to be incorporated by reference. Further, any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
   interrogating a first object with electromagnetic radiation including one or more frequencies in a range of about 200 MHz to about 1 THz for each of a number of different views of the first object;
   establishing a number of data sets each representative of a corresponding one of the different views; and
   combining the data sets to generate a topographical representation of the first object corresponding to the different views.

2. The method of claim 1, wherein the object includes a person's body and further comprising adjusting a device to the person's body based on the topographical representation.

3. The method of claim 2, wherein information corresponding to the topographical representation is stored in a portable storage apparatus and the device includes vehicle equipment.

4. The method of claim 1, which includes comparing the topographical representation of the first object with a topographical representation of a second object stored in a database.

5. The method of claim 4, which includes controlling access to a restricted area based on said comparing.

6. The method of claim 1, which includes determining one or more dimensions of the first object from the topographical representation.

7. The method of claim 6, which includes determining packaging for the first object in accordance with the one or more dimensions.

8. The method of claim 6, which includes determining shipping cost for the first object in accordance with the one or more dimensions.

9. The method of claim 1, wherein the object includes a person and further comprising predicting a change in appearance of the person based on the topographical representation.

10. A method, comprising:
    scanning an individual attempting to gain access to a restricted area with electromagnetic radiation including one or more frequencies in a range of about 200 MHz to about 1 THz;
    determining a topographical representation of the individual from said scanning;
    comparing one or more characteristics of the representation to corresponding data for each of a number of different persons; and
    controlling access to the restricted area by the individual based at least in part on said comparing.

11. The method of claim 10, wherein said controlling includes selectively activating an access control device.

12. The method of claim 10, wherein the one or more characteristics include one or more relative body dimensions of the individual.

13. The method of claim 12, which includes comparing one or more features of the individual in addition to the one or more characteristics to further determine whether to allow access.

14. The method of claim 13, wherein the one or more features include at least one of a fingerprint, a palm print, a retina image, and a vocal pattern.

15. The method of claim 10, which includes updating the corresponding data with the one or more characteristics for each access permitted by said controlling.

16. The method of claim 10, wherein said controlling includes permitting access to the restricted area if the one or more characteristics have an acceptable degree of similarity relative to the corresponding data for one of the different persons.

17. The method of claim 10, wherein said controlling includes taking action to further screen access of the individual to the restricted area in response to said comparing.

18. A method, comprising:
    scanning an individual with electromagnetic radiation including one or more frequencies in a range of about 200 MHz to about 1 THz;
    determining a topographical representation of the individual from said scanning;
    comparing one or more characteristics of the representation to corresponding information for each of a number of different parties; and
    controlling access to an area by the individual based at least in part on said comparing.

19. The method of claim 18, wherein said controlling includes taking further action to screen access of the individual to the area if said comparing indicates an unacceptable degree of similarity between the one or more characteristics and the corresponding information for one of the different parties for whom access to the area is not desirable.

20. The method of claim 18, wherein the one or more characteristics include one or more relative body dimensions of the individual.

21. The method of claim 18, wherein said controlling includes permitting access to the area if the one or more characteristics have an acceptable degree of similarity to the corresponding information for one of the different parties with permission to access the area.

22. A method, comprising:
scanning a number of passengers for a vehicle;
determining topographical information representative of each of the passengers from said scanning; and
identifying one or more bodies or body parts of the passengers using the topographical information in response to death or injury resulting from an accident involving the vehicle.

23. The method of claim 22, wherein the vehicle is a commercial aircraft.

24. The method of claim 22, which includes correlating the topographical information to a seating arrangement known for the vehicle to assist with said identifying.

25. The method of claim 22, wherein said scanning includes interrogating each of the passengers with electromagnetic radiation including one or more frequencies in a range of about 200 MHz to about 1 THz.

26. The method of claim 25, wherein said scanning is performed during a boarding process for the vehicle.

27. A method, comprising:
scanning several pieces of wreckage resulting from an accident of a vehicle;
determining a number of topographical representations corresponding to the pieces of wreckage from said scanning; and
arranging the representations relative to one another with a computer to analyze the accident.

28. The method of claim 27, which includes orienting the pieces in different spatial relationships relative to one another in a computer domain to at least partially reconstruct the vehicle.

29. The method of claim 27, which includes removing deformities of one or more of the pieces in a computer domain to assist with reconstruction of the vehicle.

30. The method of claim 27, which includes visualizing one or more of the pieces with a computer.

31. The method of claim 27, which includes generating a record in a computer of the time and place of discovery of each of the pieces.

32. The method of claim 27, which includes detecting metal or other radar reflective material at least partially embedded in a radar transparent/translucent material.

33. The method of claim 27, wherein said scanning is performed with electromagnetic radiation having one or more frequencies in a range of about 200 MHz to about 1 THz.

34. A system, comprising:
at least one array to interrogate an object with electromagnetic radiation at one or more frequencies in a range of about 200 MHz to about 1 THz;
one or more processors responsive to said array, said one or more processors being operable to establish a number of data sets each representative of a corresponding one of a number of different views of the object relative to the array and combine the data sets to generate a topographical representation of the first object corresponding to the different views; and
an output device responsive to the one or more processors to generate an output determined with the topographical representation.

35. The system of claim 34, wherein the output device is operable to adjust to a person's body based on the topographical representation.

36. The system of claim 35, wherein the output device includes vehicle equipment.

37. The system of claim 34, wherein the array is mounted to translate along a predefined path during interrogation of the object.

38. The system of claim 34, wherein one of the array and the object is operable to rotate relative to another of the array and the object.

39. The system of claim 34, further comprising a portable storage apparatus, the eq topographical representation being stored therein.

40. The system of claim 34, wherein the one or more processors are operable to provide a comparison of the topographical representation of the object with stored data to determine a degree of similarity thereto.

41. The system of claim 40, wherein the output device includes an access control device responsive to the comparison.

42. The system of claim 34, wherein the one or more processors are operable to determine a cross-section defining a circumference of the object.

* * * * *